United States Patent
Kim

(10) Patent No.: US 10,176,744 B2
(45) Date of Patent: Jan. 8, 2019

(54) METHOD OF DRIVING A DISPLAY PANEL AND DISPLAY APPARATUS FOR PERFORMING THE SAME

(71) Applicant: SAMSUNG DISPLAY CO., LTD., Yongin, Gyeonggi-do (KR)

(72) Inventor: Seon-Ki Kim, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 847 days.

(21) Appl. No.: 14/635,258

(22) Filed: Mar. 2, 2015

(65) Prior Publication Data

US 2016/0027367 A1 Jan. 28, 2016

(30) Foreign Application Priority Data

Jul. 28, 2014 (KR) ........................ 10-2014-0095877

(51) Int. Cl.
*G09G 5/10* (2006.01)
*G09G 3/20* (2006.01)
*G09G 3/34* (2006.01)
*G02F 1/1335* (2006.01)

(52) U.S. Cl.
CPC ..... *G09G 3/2025* (2013.01); *G02F 1/133621* (2013.01); *G09G 3/3426* (2013.01); *G09G 2300/0452* (2013.01); *G09G 2310/0205* (2013.01); *G09G 2310/0235* (2013.01)

(58) Field of Classification Search
None
See application file for complete search history.

(56) References Cited

U.S. PATENT DOCUMENTS

| 4,888,523 A | 12/1989 | Shoji et al. |
| 5,546,511 A | 8/1996 | Kwak |
| 5,751,384 A | 5/1998 | Sharp |
| 5,986,628 A | 11/1999 | Tuenge et al. |
| 6,185,041 B1 | 2/2001 | Tadic-Galeb et al. |
| 6,243,055 B1 | 6/2001 | Fergason |
| 6,556,181 B2 | 4/2003 | Yamada et al. |
| 7,079,162 B2 | 7/2006 | Yamada et al. |
| 7,362,304 B2 | 4/2008 | Takatori et al. |
| 7,365,729 B2 | 4/2008 | Hong |
| 7,391,486 B2 | 6/2008 | Hong |
| 7,553,525 B2 | 6/2009 | Sawatari et al. |

(Continued)

FOREIGN PATENT DOCUMENTS

| KR | 1020020039963 | 5/2002 |
| KR | 1020110125734 | 11/2011 |

*Primary Examiner* — Claire X Pappas
*Assistant Examiner* — Gerald Oliver
(74) *Attorney, Agent, or Firm* — F. Chau & Associates, LLC

(57) ABSTRACT

A method for driving a display panel is provided. The method includes turning on a first light source for generating a first light in a first sub-frame, turning on a second light source for generating a second light in a second sub-frame, turning on a third light source for generating a third light in a third sub-frame, outputting same first gate signals a first gate line and a second gate line adjacent to the first gate line, and outputting one of a first data signal corresponding to the first gate line or a second data signal corresponding to the second gate line to a data line during an active period of the first gate signals. The second frame is consecutive to the first frame.

20 Claims, 6 Drawing Sheets

(56) References Cited

U.S. PATENT DOCUMENTS

| | | | |
|---|---|---|---|
| 7,564,443 B2 | 7/2009 | Takatori et al. | |
| 7,599,041 B2 | 10/2009 | Sawatari et al. | |
| 7,932,875 B2 | 4/2011 | Dallas et al. | |
| 8,466,861 B2 | 6/2013 | Yoshihara et al. | |
| 8,576,367 B2 | 11/2013 | Yoo et al. | |
| 2001/0013977 A1 | 8/2001 | Tadic-Galeb et al. | |
| 2002/0057253 A1* | 5/2002 | Lim | G09G 3/3611 345/102 |
| 2002/0060662 A1 | 5/2002 | Hong | |
| 2002/0113764 A1 | 8/2002 | Yamada et al. | |
| 2003/0112507 A1 | 6/2003 | Divelbiss et al. | |
| 2003/0179221 A1* | 9/2003 | Nitta | G09G 3/3406 345/690 |
| 2003/0193463 A1 | 10/2003 | Yamada et al. | |
| 2004/0056831 A1 | 3/2004 | Takatori et al. | |
| 2005/0094056 A1 | 5/2005 | Hong | |
| 2005/0195975 A1 | 9/2005 | Kawakita | |
| 2005/0233094 A1 | 10/2005 | Sawatari et al. | |
| 2006/0082536 A1* | 4/2006 | Koyama | G09G 3/3659 345/100 |
| 2006/0145978 A1 | 7/2006 | Takatori et al. | |
| 2007/0057883 A1* | 3/2007 | Cho | G09G 3/3648 345/88 |
| 2007/0154652 A1 | 7/2007 | Sawatari et al. | |
| 2007/0154653 A1 | 7/2007 | Sawatari et al. | |
| 2008/0158140 A1 | 7/2008 | Takatori et al. | |
| 2008/0192158 A1 | 8/2008 | Yoshihara et al. | |
| 2009/0091525 A1* | 4/2009 | Hsu | G09G 3/3406 345/88 |
| 2009/0128543 A1* | 5/2009 | Sarma | G09G 3/3413 345/214 |
| 2009/0142865 A1 | 6/2009 | Sawatari et al. | |
| 2011/0026099 A1 | 2/2011 | Kwon et al. | |
| 2012/0013817 A1* | 1/2012 | Kim | G02F 1/134363 349/41 |
| 2012/0033151 A1* | 2/2012 | Toyotaka | G02F 1/134336 349/43 |
| 2012/0133648 A1* | 5/2012 | Hirakata | G09G 3/342 345/419 |
| 2013/0100122 A1* | 4/2013 | Moon | G09G 3/003 345/419 |

* cited by examiner

METHOD OF DRIVING A DISPLAY PANEL AND DISPLAY APPARATUS FOR PERFORMING THE SAME

CROSS-REFERENCE TO RELATED APPLICATION

This application claims priority under 35 U.S.C. § 119 to Korean Patent Application No. 10-2014-0095877, filed on Jul. 28, 2014, in the Korean Intellectual Property Office, the disclosure of which is incorporated by reference herein in its entirety.

TECHNICAL FIELD

Exemplary embodiments of the present inventive concept relate to a display apparatus, and more particularly to a method for driving a display panel and a display apparatus for performing the method.

DISCUSSION OF THE RELATED ART

To reduce light loss, a field sequential color display without using a color filter has been developed. According to the field sequential color display, a red light, a green light, and a blue light are time-divisionally transmitted through a same pixel and thus, a full-color image may be displayed by using persistence of vision for human eyes. The field sequential color display divides a frame into a red sub-frame, a green sub-frame, and a blue sub-frame to time-divisionally display the image. Thus, the field sequential color display may enable wide color reproduction, increase resolution of a display panel, and reduce motion blur, power consumption, or manufacturing cost.

SUMMARY

According to an exemplary embodiment of the present inventive concept, a method for driving a display panel is provided. The method includes turning on a first light source configured to generate a first light in a first sub-frame of each of first and second frames, turning on a second light source configured to generate a second light in a second sub-frame of each of the first and second frames, turning on a third light source configured to generate a third light in a third sub-frame of each of the first and second frames, outputting same first gate signals to a first gate line and a second gate line adjacent to the first gate line, and outputting one of a first data signal corresponding to the first gate line or a second data signal corresponding to the second gate line to a data line during a high period of the first gate signals. The second frame is consecutive to the first frame. The first through third lights have different colors from each other.

In an exemplary embodiment of the present inventive concept, the first data signal corresponding to the first gate line may be outputted to the data line during an active period of the first gate signals in the first sub-frame of the first frame. The second data signal corresponding to the second gate line may be outputted to the data line during an active period of the first gate signals in the first sub-frame of the second frame.

In an exemplary embodiment of the present inventive concept, the method may further include turning on the second light source in a fourth sub-frame of each of the first and second frames.

In an exemplary embodiment of the present inventive concept, the second light source may be configured to generate a green light.

In an exemplary embodiment of the present inventive concept, the first data signal corresponding to the first gate line may be outputted to the data line during an active period of the first gate signals in the second sub-frame of the first frame. The second data signal corresponding to the second gate line may be outputted to the data line during an active period of the first gate signals in the fourth sub-frame of the first frame.

In an exemplary embodiment of the present inventive concept, the first data signal corresponding to the first gate line may be outputted to the data line during an active period of a gate signal in the first sub-frame of the first frame. The second data signal corresponding to the second gate line may be outputted to the data line during an active period of the first gate signals in the third sub-frame of the first frame.

In an exemplary embodiment of the present inventive concept, a number of the second light sources may be less than a number of the first light sources or a number of the third light sources.

In an exemplary embodiment of the present inventive concept, the first data signal corresponding to the first gate line may be outputted to the data line during an active period of the first gate signals in the first sub-frame of the first frame. The second data signal corresponding to the second gate line may be outputted to the data line during an active period of the first gate signals in the first sub-frame of the second frame.

In an exemplary embodiment of the present inventive concept, the method may further include turning on the first light source, the second light source, and the third light source in a fourth sub-frame of each of the first and second frames.

In an exemplary embodiment of the present inventive concept, the first data signal corresponding to the first gate line may be outputted to the data line during an active period of the first gate signals in the first sub-frame, the second sub-frame, or the third sub-frame of the first frame. The second data signal corresponding to the second gate line may be outputted to the data line during an active period of the first gate signals in the fourth sub-frame of the first frame.

In an exemplary embodiment of the present inventive concept, the first data signal corresponding to the first gate line may be outputted to the data line during an active period of the first gate signals in the first sub-frame of the first frame. The second data signal corresponding to the second gate line may be outputted to the data line during an active period of the first gate signals in the first sub-frame of the second frame.

According to an exemplary embodiment of the present inventive concept, a display apparatus includes a display panel, a light source part, a gate driver, and a data driver. The display panel is configured to display an image. The light source part is configured to provide a light to the display panel. The light source part is configured to turn on a first light source for generating a first light in a first sub-frame of each of first and second frames, to turn on a second light source for generating a second light having a color different from that of the first light in a second sub-frame of each of the first and second frames, and to turn on a third light source for generating a third light having a color different from those of the first and second lights in a third sub-frame of each of the first and second frames. The second frame is consecutive to the first frame. The gate driver is configured to output same first gate signals to a first gate line and a second gate line of the display panel. The second gate line is adjacent to the first gate line. The data driver is configured to one of a first data signal corresponding to the first gate line or a second data signal corresponding to the second gate line to the data line of the display panel during an active period of the first gate signals in each of the first through third sub-frames.

In an exemplary embodiment of the present inventive concept, the data driver may be configured to output the first data signal corresponding to the first gate line to the data line during an active period of the first gate signals in the first sub-frame of the first frame, and to output the second data signal corresponding to the second gate line to the data line during an active period of the first gate signals in the first sub-frame of the second frame.

In an exemplary embodiment of the present inventive concept, the light source part may be configured to turn on the second light source in a fourth sub-frame of each of the first and second frames.

In an exemplary embodiment of the present inventive concept, the second light source may be configured to generate a green light.

In an exemplary embodiment of the present inventive concept, the data driver may be configured to output the first data signal corresponding to the first gate line to the data line during an active period of the first gate signals in the second sub-frame of the first frame, and to output the second data signal corresponding to the second gate line to the data line during an active period of the first gate signals in the fourth sub-frame of the first frame.

In an exemplary embodiment of the present inventive concept, a number of the second light sources may be less than a number of the first light sources or a number of the third light sources.

In an exemplary embodiment of the present inventive concept, the light source part may be configured to turn on the first light source, the second light source, and the third light source in a fourth sub-frame of each of the first and second frames.

In an exemplary embodiment of the present inventive concept, the data driver may be configured to output the first data signal corresponding to the first gate line to the data line during an active period of the first gate signals in the first sub-frame of the first frame, the second sub-frame of the first frame, or the third sub-frame of the first frame, and to output the second data signal corresponding to the second gate line to the data line during an active period of the first gate signals in the fourth sub-frame of the first frame.

According to an exemplary embodiment of the present inventive concept, a method for driving a display panel is provided. The method includes turning on a first light source having a first color configured to generate a first light in a first sub-frame in a frame, turning on the first light source having the first color in a third sub-frame in the frame, outputting same first gate signals to a first gate line and a second gate line adjacent to the first gate line, outputting a first data signal corresponding to the first gate line to a data line during an active period of the first gate signals in the first sub-frame of the frame, and outputting a second data signal corresponding to the second gate line to the data line during an active period of the first gate signals in the third sub-frame of the frame. Each of the first and second frames includes the first sub-frame, a second sub-frame, the third sub-frame, and a fourth sub-frame.

BRIEF DESCRIPTION OF THE DRAWINGS

The above and other features of the present inventive concept will become more apparent by describing in detail exemplary embodiments thereof with reference to the accompanying drawings in which.

DETAILED DESCRIPTION OF THE EMBODIMENTS

Hereinafter, exemplary embodiments of the present inventive concept will be described more fully with reference to the accompanying drawings in which exemplary embodiments thereof are shown.

It will be understood that, although the terms first, second, etc. may be used herein to describe various elements, these elements should not be limited by these terms. These terms are only used to distinguish one element from another.

Figure 1:
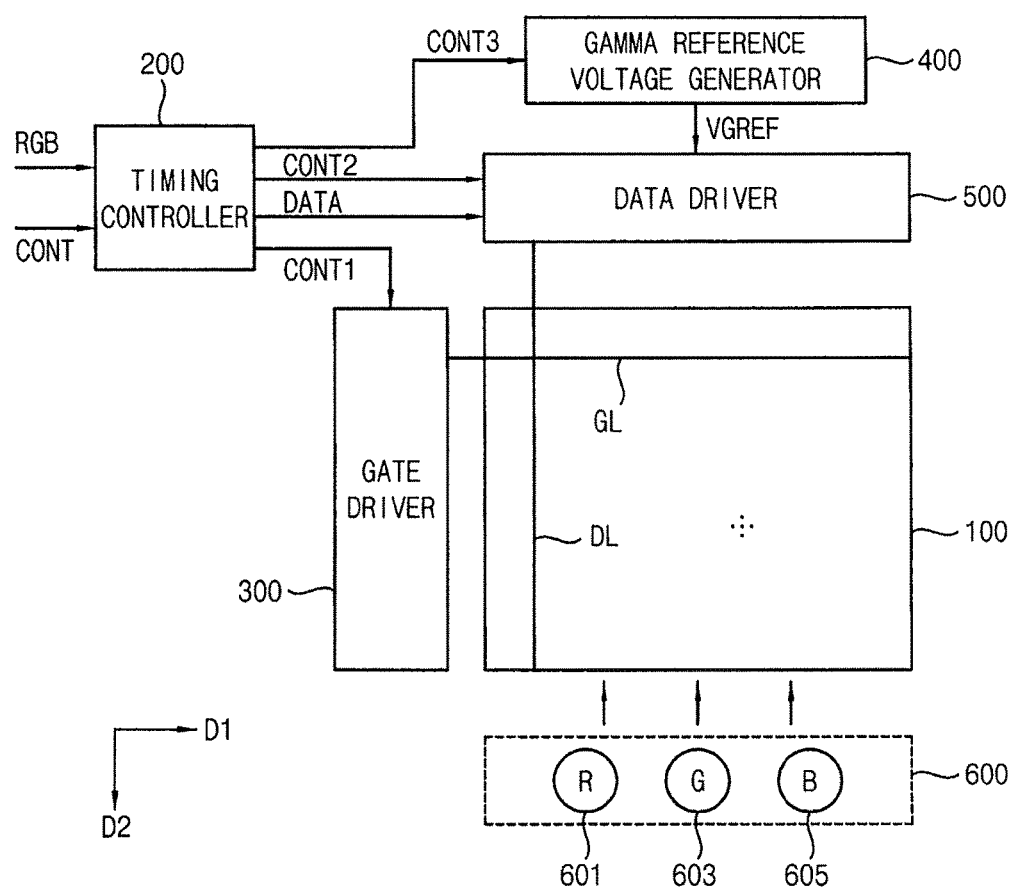
FIG. 1 is a block diagram of a display apparatus according to an exemplary embodiment of the present inventive concept.

FIG. 1 is a block diagram of a display apparatus according to an exemplary embodiment of the present inventive concept.

Referring to FIG. 1, a display apparatus includes a display panel 100 and a panel driver. The panel driver includes a timing controller 200, a gate driver 300, a gamma reference voltage generator 400, a data driver 500, and a light source part 600.

The display panel 100 includes a display region for displaying an image and a peripheral region adjacent to the display region.

The display panel 100 includes a plurality of gate lines GL, a plurality of data lines DL, and a plurality of pixels electrically connected to the gate lines GL and the data lines DL. The gate lines GL extend in a first direction D1, and the data lines DL extend in a second direction D2 crossing the first direction D1.

Each pixel includes a switching element (not shown), a liquid crystal capacitor (not shown) electrically connected to the switching element, and a storage capacitor (not shown). The pixels may be arranged in a matrix form.

The timing controller 200 receives input image data RGB and an input control signal CONT from an external device (not shown). The input image data RGB may include red image data, green image data, and blue image data. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3, and a data signal DATA based on the input image data RGB and the input control signal CONT.

The timing controller 200 generates the first control signal CONT1 for controlling the gate driver 300 based on the input control signal CONT, and outputs the first control signal CONT1 to the gate driver 300. The first control signal CONT1 may further include a vertical start signal and a gate clock signal.

The timing controller 200 generates the second control signal CONT2 for controlling the data driver 500 based on the input control signal CONT, and outputs the second control signal CONT2 to the data driver 500. The second control signal CONT2 may include a horizontal start signal and a load signal. The second control signal CONT2 may further include an inversion-control signal.

The timing controller 200 generates the data signal DATA based on the input image data RGB. The timing controller 200 outputs the data signal DATA to the data driver 500.

The timing controller 200 generates the third control signal CONT3 for controlling the gamma reference voltage generator 400 based on the input control signal CONT, and outputs the third control signal CONT3 to the gamma reference voltage generator 400.

The gate driver 300 generates gate signals for driving the gate lines GL (e.g., first through N-th gate lines GL1 through GLN, N being an integer greater than 1) in response to the first control signal CONT1 received from the timing controller 200. The gate driver 300 sequentially outputs the gate signals to the gate lines GL.

The gate driver 300 outputs substantially the same gate signals (e.g., gate signals having a same phase) to the first gate line GL1 and the second gate line GL2 adjacent to the first gate line GL1. Operation of the gate driver 300 will be described in more detail with reference to FIG. 2A.

The gate driver 300 may be directly mounted on the display panel 100, or may be connected to the display panel 100 as a tape carrier package (TCP) type. In an exemplary embodiment of the present inventive concept, the gate driver 300 may be integrated on the peripheral region of the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF corresponds to a data signal DATA.

In an exemplary embodiment of the present inventive concept, the gamma reference voltage generator 400 may be disposed or mounted in the timing controller 200. In an exemplary embodiment of the present inventive concept, the gamma reference voltage generator 400 may be disposed or mounted in the data driver 500.

The data driver 500 receives the second control signal CONT2 and the data signal DATA from the timing controller 200, and receives the gamma reference voltage VGREF from the gamma reference voltage generator 400. The data driver 500 changes the data signal DATA to an analog data signal by using the gamma reference voltage VGREF. The data driver 500 outputs the analog data signal to the data line DL.

The data driver 500 outputs one of a first data signal (e.g., an analog data signal) corresponding to the first gate line GL1 and a second data signal corresponding to the second gate line GL2 to the data line DL during a logical high period of the gate signals outputted to the first gate line GL1 and the second gate line GL2. Operation of the data driver 500 will be described in more detail with reference to FIG. 2A.

The data driver 500 may be directly mounted on the display panel 100, or may be connected to the display panel 100 as a tape carrier package (TCP) type. In an exemplary embodiment of the present inventive concept, the data driver 500 may be integrated on the peripheral region of the display panel 100.

The light source part 600 provides light to the display panel 100. The light source part 600 includes a first light source 601, a second light source 603, and a third light source 605. The first light source 601, the second light source 603, and the third light source 605 may be respectively one of a red light source, a green light source, and a blue light source. Each of the first light source 601, the second light source 603, and the third light source 605 may include at least one light-emitting diode. The numbers of the first light source 601, the second light source 603, and the third light source 605 may be different from each other.

The light source part 600 sequentially provides lights generated from the first light source 601, the second light source 603, and the third light source 605 to the display panel 100. Operation of the light source part 600 will be described in more detail with reference to FIG. 2A.

Figure 2A:
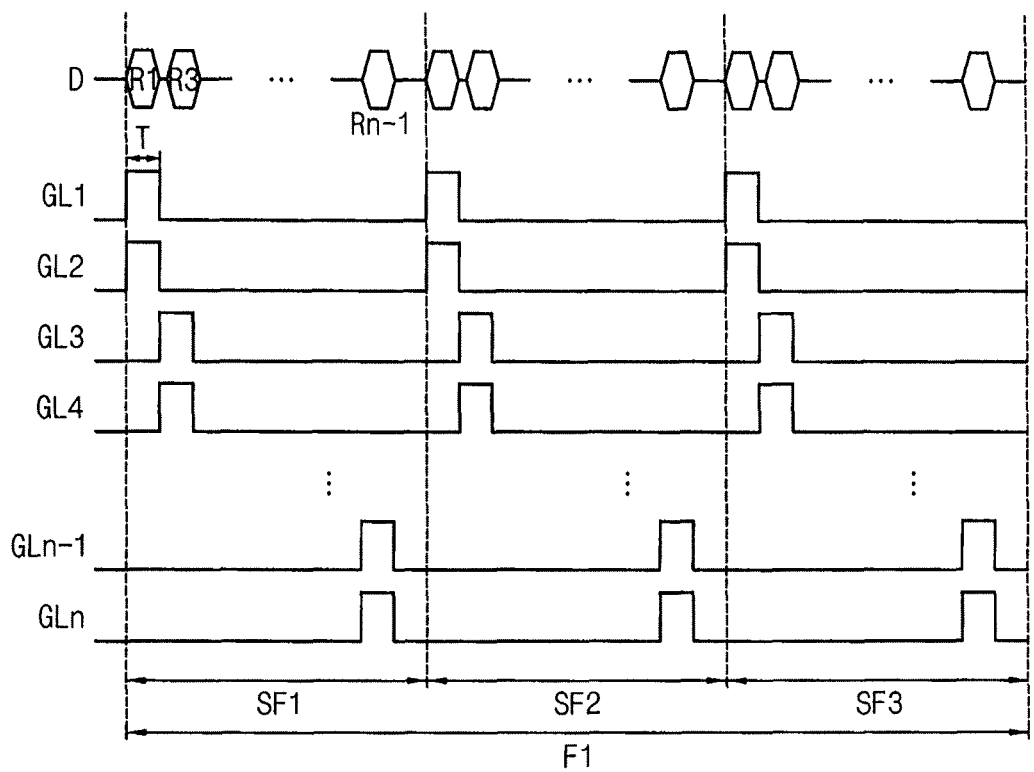
FIG. 2A is a waveform diagram illustrating gate signals and data signals of FIG. 1 according to an exemplary embodiment of the present inventive concept.
Figure 2A:
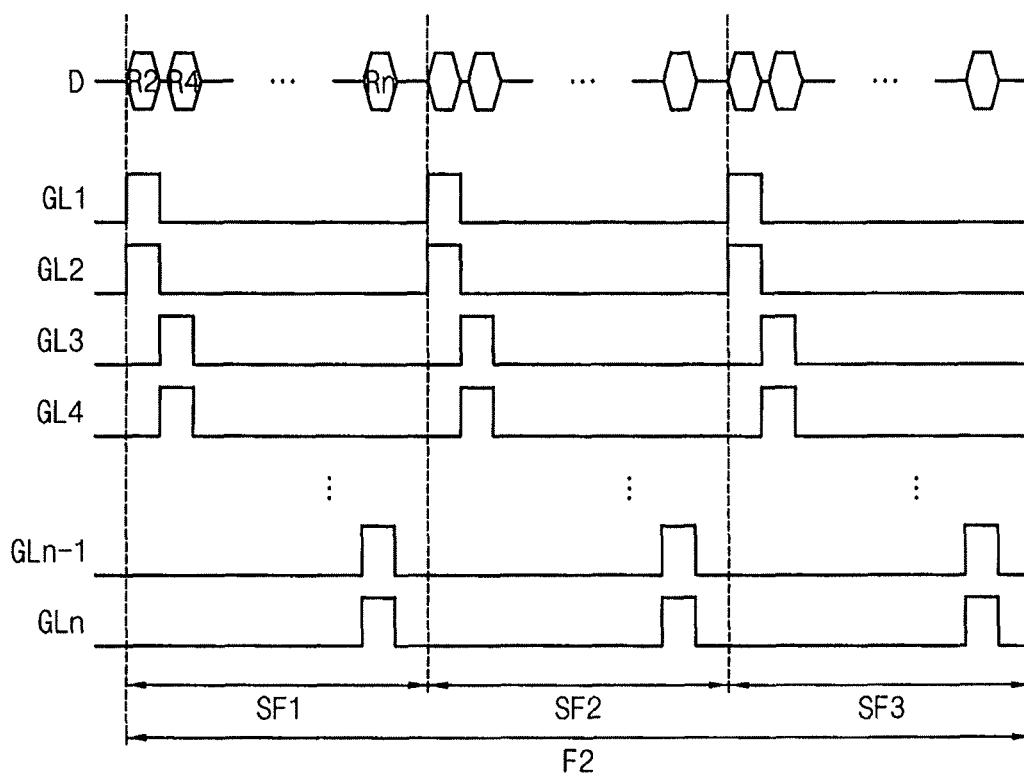

FIG. 2A is a waveform diagram illustrating gate signals and data signals of FIG. 1 according to an exemplary embodiment of the present inventive concept.

Referring to FIGS. 1 and 2A, the light source part 600 sequentially provides lights from the first light source 601, the second light source 603, and the third light source 605 to the display panel 100. The light source part 600 turns on the first light source 601 in a first sub-frame SF1 of a first frame F1. The light source part 600 turns on the second light source 603 in a second sub-frame SF2 of the first frame F1. The light source part 600 turns on the third light source 605 in a third sub-frame SF3 of the first frame F1.

The first light source 601, the second light source 603, and the third light source 605 may be respectively one of a red light source generating a red light, a green light source generating a green light, and a blue light source generating a blue light. For example, the first light source 601 may be a red light source R, the second light source 603 may be a green light source G, and the third light source 605 may be a blue light source B.

Each of the first light source 601, the second light source 603, and the third light source 605 may include at least one light-emitting diode. The numbers of the first light source 601, the second light source 603, and the third light source 605 may be different from each other.

The gate driver 300 generates gate signals for driving the gate lines GL in response to the first control signal CONT1 received from the timing controller 200. The gate driver 300 sequentially outputs the gate signals to the gate lines GL.

The gate driver 300 outputs substantially the same gate signals to the first gate line GL1 and the second gate line GL2 adjacent to the first gate line GL1. For example, the gate driver 300 may output a first gate-on signal (e.g., a gate signal having a logical high state) for the first gate line GL1 and a second gate-on signal (e.g., a gate signal having a logical high state) for the second gate line GL2 at the same time, and thus the first gate line GL1 and the second gate line GL2 may be activated at the same time. In addition, the gate driver 300 may output substantially the same gate signals to an (n−1)-th gate line GLn−1 and an n-th gate line GLn adjacent to the (n−1)-th gate line GLn−1. Here, n may be an even integer number.

The first gate line GL1 to the n-th gate line GLn are scanned in the first sub-frame SF1 of the first frame F1. The first gate line GL1 to the n-th gate line GLn are scanned in the second sub-frame SF2 of the first frame F1. The first gate line GL1 to the n-th gate line GLn are scanned in the third sub-frame SF3 of the first frame F1.

The data driver 500 receives the second control signal CONT2 and the data signal DATA from the timing controller 200, and receives the gamma reference voltage VGREF from the gamma reference voltage generator 400. The data driver 500 changes the data signal DATA to an analog data signal by using the gamma reference voltage VGREF. The data driver 500 outputs the analog data signal to the data line DL.

The data driver 500 may output a data signal (e.g., the analog data signal), which corresponds to the first gate line GL1, to the data line DL during a logical high period T of the gate signals outputted to the first gate line GL1 and the second gate line GL2. In an exemplary embodiment of the present inventive concept, the data driver 500 may output a data signal (e.g., the analog data signal), which corresponds to the second gate line GL2, to the data line DL during a logical high period T of the gate signals outputted to the first gate line GL1 and the second gate line GL2.

The data driver 500 may output a red data signal R1 corresponding to the first gate line GL1 to the data line DL during a logical high period T of the gate signals outputted to the first gate line GL1 and the second gate line GL2 in the first sub-frame SF1 of the first frame F1. The data driver 500 may output a red data signal R2 corresponding to the second gate line GL2 to the data line DL during a logical high period T of the gate signals outputted to the first gate line GL1 and the second gate line GL2 in the first sub-frame SF1 of the second frame F2.

The data driver 500 may output a green data signal G1 corresponding to the first gate line GL1 to the data line DL during a logical high period T of the gate signals outputted to the first gate line GL1 and the second gate line GL2 T in the second sub-frame SF2 of the first frame F1. The data driver 500 may output a green data signal G2 corresponding to the second gate line GL2 to the data line DL during a logical high period T of the gate signals outputted to the first gate line GL1 and the second gate line GL2 in the second sub-frame SF2 of the second frame F2.

The data driver 500 may output a blue data signal B1 corresponding to the first gate line GL1 to the data line DL during a logical high period T of the gate signals outputted to the first gate line GL1 and the second gate line GL2 in the third sub-frame SF3 of the first frame F1. The data driver 500 may output a blue data signal B2 corresponding to the second gate line GL2 to the data line DL during a logical high period T of the gate signals outputted to the first gate line GL1 and the second gate line GL2 in the third sub-frame SF3 of the second frame F2.

Figure 2B:
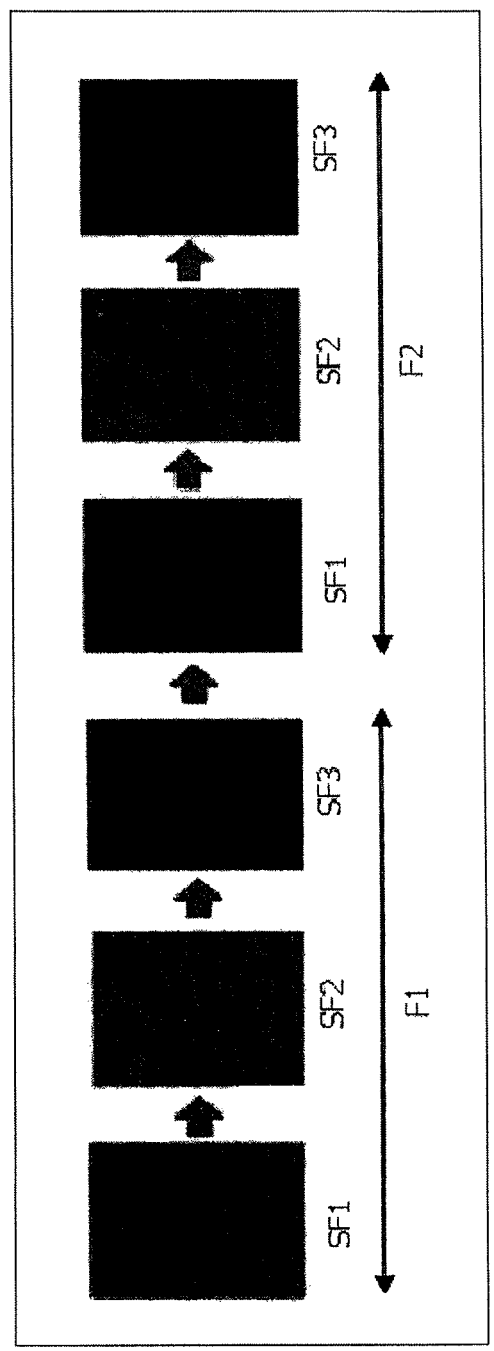
FIG. 2B is a view illustrating an image displayed in each of sub-frames of FIG. 2A according to an exemplary embodiment of the present inventive concept.

FIG. 2B is a view illustrating an image displayed in each of the sub-frames of FIG. 2A according to an exemplary embodiment of the present inventive concept.

Referring to FIGS. 1, 2A, and 2B, the light source part 600 turns on the first light source 601 (e.g., the red light source R) and generates a red light in the first sub-frame SF1 of the first frame F1.

The gate driver 300 outputs substantially the same gate signals to the first gate line GL1 and the second gate line GL2 adjacent to the first gate line GL1 in the first sub-frame SF1 of the first frame F1. In addition, the gate driver 300 may output substantially the same gate signals to the (n−1)-th gate line GLn−1 and the n-th gate line GLn adjacent to the (n−1)-th gate line GLn−1 in the first sub-frame SF1 of the first frame F1.

The data driver 500 may output the red data signal R1 corresponding to the first gate line GL1 to the data line DL during a logical high period T of the gate signals outputted to the first gate line GL1 and the second gate line GL2 in the first sub-frame SF1 of the first frame F1. The data driver 500 may output a red data signal Rn−1 corresponding to the (n−1)-th gate line GLn−1 to the data line DL during a logical high period T of the gate signals outputted to the (n−1)-th gate line GLn−1 and the n-th gate line GLn in the first sub-frame SF1 of the first frame F1. In an exemplary embodiment of the present inventive concept, the data driver 500 may output the red data signal R2 corresponding to the second gate line GL2 to the data line DL during a logical high period T of the gate signals outputted to the first gate line GL1 and the second gate line GL2 in the first sub-frame SF1 of the first frame F1. The data driver 500 may output a red data signal Rn corresponding to the n-th gate line GLn to the data line DL during a logical high period T of the gate signals outputted to the (n−1)-th gate line GLn−1 and the n-th gate line GLn in the first sub-frame SF1 of the first frame F1.

The light source part 600 turns on the second light source 603 (e.g., the green light source G) and generates a green light in the second sub-frame SF2 of the first frame F1.

The gate driver 300 outputs substantially the same gate signals to the first gate line GL1 and the second gate line GL2 in the second sub-frame SF2 of the first frame F1. In addition, the gate driver 300 may output substantially the same gate signals to the (n−1)-th gate line GLn−1 and the n-th gate line GLn in the second sub-frame SF2 of the first frame F1.

The data driver 500 may output the green data signal G1 corresponding to the first gate line GL1 to the data line DL during a logical high period T of the gate signals outputted to the first gate line GL1 and the second gate line GL2 in the second sub-frame SF2 of the first frame F1. The data driver 500 may output a green data signal Gn−1 corresponding to the (n−1)-th gate line GLn−1 to the data line DL during a logical high period T of the gate signals outputted to the (n−1)-th gate line GLn−1 and the n-th gate line GLn in the second sub-frame SF2 of the first frame F1. In an exemplary embodiment of the present inventive concept, the data driver 500 may output the green data signal G2 corresponding to the second gate line GL2 to the data line DL during a logical high period T of the gate signals outputted to the first gate line GL1 and the second gate line GL2 in the second sub-frame SF2 of the first frame F1. The data driver 500 may output a green data signal Gn corresponding to the n-th gate line GLn to the data line DL during a logical high period T of the gate signals outputted to the (n−1)-th gate line GLn−1 and the n-th gate line GLn in the second sub-frame SF2 of the first frame F1.

The light source part 600 turns on the third light source 605 (e.g., the blue light source B) and generates a blue light in the third sub-frame SF3 of the first frame F1. The gate driver 300 outputs substantially the same gate signals to the first gate line GL1 and the second gate line GL2 in the third sub-frame SF3 of the first frame F1. In addition, the gate driver 300 may output substantially the same gate signals to the (n−1)-th gate line GLn−1 and the n-th gate line GLn in the third sub-frame SF3 of the first frame F1.

The data driver 500 may output the blue data signal B1 corresponding to the first gate line GL1 to the data line DL during a logical high period T of the gate signals outputted to the first gate line GL1 and the second gate line GL2 in the third sub-frame SF3 of the first frame F1. The data driver 500 may output a blue data signal Bn−1 corresponding to the (n−1)-th gate line GLn−1 to the data line DL during a logical high period T of the gate signals outputted to the (n−1)-th gate line GLn−1 and the n-th gate line GLn in the third sub-frame SF3 of the first frame F1. In an exemplary embodiment of the present inventive concept, the data driver 500 may output the blue data signal B2 corresponding to the second gate line GL2 to the data line DL during a logical high period T of the gate signals outputted to the first gate line GL1 and the second gate line GL2 in the third sub-frame SF3 of the first frame F1. In addition, the data driver 500 may output a blue data signal Bn corresponding to the n-th gate line GLn to the data line DL during a logical high period T of the gate signals outputted to the (n−1)-th gate line GLn−1 and the n-th gate line GLn in the third sub-frame SF3 of the first frame F1.

The light source part 600 turns on the first light source 601 (e.g., the red light source R) and generates a red light in the first sub-frame SF1 of the second frame F2.

The gate driver 300 outputs substantially the same gate signals to the first gate line GL1 and the second gate line GL2 in the first sub-frame SF1 of the second frame F2. In addition, the gate driver 300 may output substantially the same gate signals to the (n−1)-th gate line GLn−1 and the n-th gate line GLn in the first sub-frame SF1 of the second frame F2.

The data driver 500 may output the red data signal R2 corresponding to the second gate line GL2 to the data line DL during a logical high period T of the gate signals outputted to the first gate line GL1 and the second gate line GL2 in the first sub-frame SF1 of the second frame F2. The data driver 500 may output a red data signal Rn corresponding to the n-th gate line GLn to the data line DL during a logical high period T of the gate signals outputted to the (n−1)-th gate line GLn−1 and the n-th gate line GLn in the first sub-frame SF1 of the second frame F2. In an exemplary embodiment of the present inventive concept, the data driver 500 may output the red data signal R1 corresponding to the first gate line GL1 to the data line DL during a logical high period T of the gate signals outputted to the first gate line GL1 and the second gate line GL2 in the first sub-frame SF1 of the second frame F2. The data driver 500 may output the red data signal Rn−1 corresponding to the (n−1)-th gate line GLn−1 to the data line DL during a logical high period T of the gate signals outputted to the (n−1)-th gate line GLn−1 and the n-th gate line GLn in the first sub-frame SF1 of the second frame F2.

The light source part 600 turns on the second light source 603 (e.g., the green light source G) and generates a green light in the second sub-frame SF2 of the second frame F2.

The gate driver 300 outputs substantially the same gate signals to the first gate line GL1 and the second gate line GL2 in the second sub-frame SF2 of the second frame F2. The gate driver 300 may output substantially the same gate signals to the (n−1)-th gate line GLn−1 and the n-th gate line GLn in the second sub-frame SF2 of the second frame F2.

The data driver 500 may output the green data signal G2 corresponding to the second gate line GL2 to the data line DL during a logical high period T of the gate signals outputted to the first gate line GL1 and the second gate line GL2 in the second sub-frame SF2 of the second frame F2. In addition, the data driver 500 may output the green data signal Gn corresponding to the n-th gate line GLn to the data line DL during a logical high period T of the gate signals outputted to the (n−1)-th gate line GLn−1 and the n-th gate line GLn in the second sub-frame SF2 of the second frame F2. In an exemplary embodiment of the present inventive concept, the data driver 500 may output the green data signal G1 corresponding to the first gate line GL1 to the data line DL during a logical high period T of the gate signals outputted to the first gate line GL1 and the second gate line GL2 in the second sub-frame SF2 of the second frame F2. In addition, the data driver 500 may output the green data signal Gn−1 corresponding to the (n−1)-th gate line GLn−1 to the data line DL during a logical high period T of the gate signals outputted to the (n−1)-th gate line GLn−1 and the n-th gate line GLn in the second sub-frame SF2 of the second frame F2.

The light source part 600 turns on the third light source 605 (e.g., the blue light source B) and generates a blue light in the third sub-frame SF3 of the second frame F2.

The gate driver 300 outputs substantially the same gate signals to the first gate line GL1 and the second gate line GL2 in the third sub-frame SF3 of the second frame F2. The gate driver 300 may output substantially the same gate signals to the (n−1)-th gate line GLn−1 and the n-th gate line GLn in the third sub-frame SF3 of the second frame F2.

The data driver 500 may output the blue data signal B2 corresponding to the second gate line GL2 to the data line DL during a logical high period T of the gate signals outputted to the first gate line GL1 and the second gate line GL2 in the third sub-frame SF3 of the second frame F2. The data driver 500 may output the blue data signal Bn corresponding to the n-th gate line GLn to the data line DL during a logical high period T of the gate signals outputted to the (n−1)-th gate line GLn−1 and the n-th gate line GLn in the third sub-frame SF3 of the second frame F2. In an exemplary embodiment of the present inventive concept, the data driver 500 may output the blue data signal B1 corresponding to the first gate line GL1 to the data line DL during a logical high period T of the gate signals outputted to the first gate line GL1 and the second gate line GL2 in the third sub-frame SF3 of the second frame F2. The data driver 500 may output the blue data signal Bn−1 corresponding to the (n−1)-th gate line GLn−1 to the data line DL during a logical high period T of the gate signals outputted to the (n−1)-th gate line GLn−1 and the n-th gate line GLn in the third sub-frame SF3 of the second frame F2.

According to an exemplary embodiment of the present inventive concept, when a frame is divided into three sub-frames, substantially the same gate signals are outputted to two gate lines. For example, the two gate lines may be adjacent to each other. Thus, a charging time for a pixel may be doubled. In addition, data signals corresponding to the two gate lines are alternately outputted in the same sub-frames of consecutive frames, and thus, decrease in vertical resolution may be reduced or minimized.

Figure 3A:
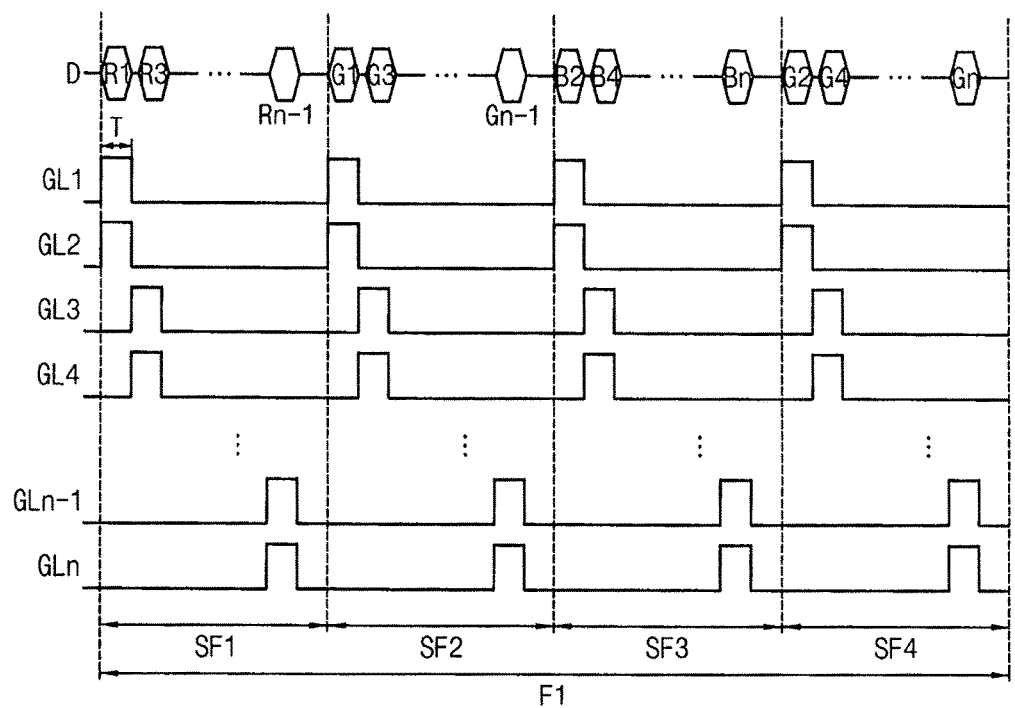
FIG. 3A is a waveform diagram illustrating gate signals and data signals according to an exemplary embodiment of the present inventive concept.
Figure 3A:
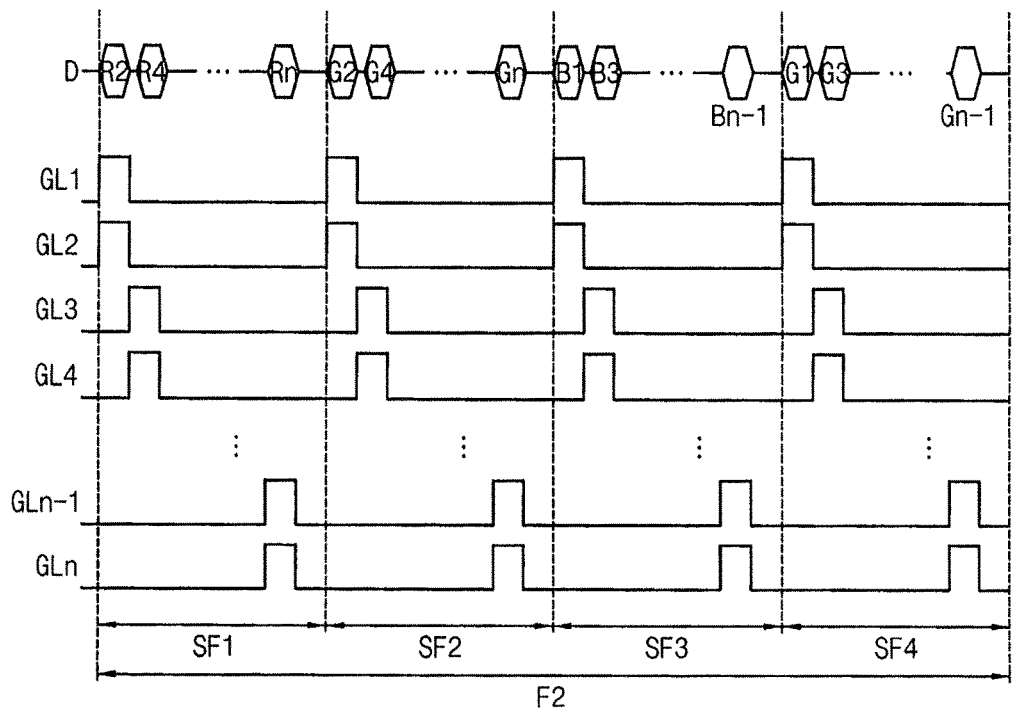

FIG. 3A is a waveform diagram illustrating gate signals and data signals according to an exemplary embodiment of the present inventive concept.

Referring to FIGS. 1 and 3A, the light source part 600 sequentially provides lights generated from the first light source 601, the second light source 603, and the third light source 605 to the display panel 100. The light source part 600 may further turn on the second light source 603 after turning on the third light source 605. For example, the light source part 600 turns on the first light source 601 in a first sub-frame SF1 of a first frame F1. The light source part 600 turns on the second light source 603 in a second sub-frame SF2 of the first frame F1. The light source part 600 turns on the third light source 605 in a third sub-frame SF3. The light source part 600 turns on the second light source 603 in a fourth sub-frame SF4.

The first light source 601, the second light source 603, and the third light source 605 may be respectively one of a red light source generating a red light, a green light source generating a green light, and a blue light source generating a blue light. For example, the first light source 601 may be a red light source R, the second light source 603 may be a green light source G, and the third light source 605 may be a blue light source B.

Each of the first light source 601, the second light source 603, and the third light source 605 may include at least one light-emitting diode. The numbers of the first light source 601, the second light source 603, and the third light source 605 may be different from each other.

A gate driver 300 generates gate signals for driving gate lines GL in response to a first control signal CONT1 received from a timing controller 200. The gate driver 300 sequentially outputs the gate signals to the gate lines GL.

The gate driver 300 outputs substantially the same gate signals to a first gate line GL1 and a second gate line GL2 adjacent to the first gate line GL1. The gate driver 300 may output substantially the same gate signals to an (n−1)-th gate line GLn−1 and an n-th gate line GLn adjacent to the (n−1)-th gate line GLn−1. Here, n may be an even integer number.

The first gate line GL1 to the n-th gate line GLn are scanned in the first sub-frame SF1. The first gate line GL1 to the n-th gate line GLn are scanned in the second sub-frame SF2. The first gate line GL1 to the n-th gate line GLn are scanned in the third sub-frame SF3. The first gate line GL1 to the n-th gate line GLn are scanned in the fourth sub-frame SF4.

A data driver 500 receives a second control signal CONT2 and a data signal DATA from the timing controller 200, and receives a gamma reference voltage VGREF from a gamma reference voltage generator 400. The data driver 500 changes the data signal DATA to an analog data signal by using the gamma reference voltage VGREF. The data driver 500 outputs the analog data signal to the data line DL.

The data driver 500 may output a data signal (e.g., the analog data signal), which corresponds to the first gate line GL1, to the data line DL during a logical high period T of the gate signals outputted to the first gate line GL1 and the second gate line GL2. In an exemplary embodiment of the present inventive concept, the data driver 500 may output a data signal, which corresponds to the second gate line GL2, to the data line DL during a logical high period T of the gate signals outputted to the first gate line GL1 and the second gate line GL2.

In an exemplary embodiment of the present inventive concept, the data driver 500 may output a green data signal G1 corresponding to the first gate line GL1 to the data line DL during a logical high period T of the gate signals outputted to the first gate line GL1 and the second gate line GL2 in the second sub-frame SF2. The data driver 500 may output a green data signal G2 corresponding to the second gate line GL2 to the data line DL during a logical high period T of the gate signals outputted to the first gate line GL1 and the second gate line GL2 in the fourth sub-frame SF4.

In an exemplary embodiment of the present inventive concept, the data driver 500 may output the green data signal G1 corresponding to the first gate line GL1 to the data line DL during a logical high period T of the gate signals outputted to the first gate line GL1 and the second gate line GL2 in the first sub-frame SF1. The data driver 500 may output the green data signal G2 corresponding to the second gate line GL2 to the data line DL during a logical high period T of the gate signals outputted to the first gate line GL1 and the second gate line GL2 in the third sub-frame SF3.

In an exemplary embodiment of the present inventive concept, the data driver 500 may output the green data signal G2 corresponding to the second gate line GL2 to the data line DL during a logical high period T of the gate signals outputted to the first gate line GL1 and the second gate line GL2 in the second sub-frame SF2. The data driver 500 may output the green data signal G1 corresponding to the first gate line GL1 to the data line DL during a logical high period T of the gate signals outputted to the first gate line GL1 and the second gate line GL2 in the fourth sub-frame SF4.

In an exemplary embodiment of the present inventive concept, the data driver 500 may output the green data signal G2 corresponding to the second gate line GL2 to the data line DL during a logical high period T of the gate signals outputted to the first gate line GL1 and the second gate line GL2 in the first sub-frame SF1. The data driver 500 may output the green data signal G1 corresponding to the first gate line GL1 to the data line DL during a logical high period T of the gate signals outputted to the first gate line GL1 and the second gate line GL2 in the third sub-frame SF3.

Referring back to FIG. 3A, for example, the data driver 500 may output the red data signal R1 corresponding to the first gate line GL1 to the data line DL during a logical high period T of the gate signals outputted to the first gate line GL1 and the second gate line GL2 in the first sub-frame SF1 of the first frame F1. The data driver 500 may output the red data signal R2 corresponding to the second gate line GL2 to the data line DL during a logical high period T of the gate signals outputted to the first gate line GL1 and the second gate line GL2 in the first sub-frame SF1 of the second frame F2.

The data driver 500 may output the green data signal G1 corresponding to the first gate line GL1 to the data line DL during a logical high period T of the gate signals outputted to the first gate line GL1 and the second gate line GL2 in the second sub-frame SF2 of the first frame F1. The data driver 500 may output the green data signal G2 corresponding to the second gate line GL2 to the data line DL during a logical high period T of the gate signals outputted to the first gate line GL1 and the second gate line GL2 in the second sub-frame SF2 of the second frame F2.

The data driver 500 may output the blue data signal B2 corresponding to the second gate line GL2 to the data line DL during a logical high period T of the gate signals outputted to the first gate line GL1 and the second gate line GL2 in the third sub-frame SF3 of the first frame F1. The data driver 500 may output the blue data signal B1 corresponding to the first gate line GL1 to the data line DL during a logical high period T of the gate signals outputted to the first gate line GL1 and the second gate line GL2 in the third sub-frame SF3 of the second frame F2.

The data driver 500 may output the green data signal G2 corresponding to the second gate line GL2 to the data line DL during a logical high period T of the gate signals outputted to the first gate line GL1 and the second gate line GL2 in the fourth sub-frame SF4 of the first frame F1. The data driver 500 may output the green data signal G1 corresponding to the first gate line GL1 to the data line DL during a logical high period T of the gate signals outputted to the first gate line GL1 and the second gate line GL2 in the fourth sub-frame SF4 of the second frame F2.

Figure 3B:
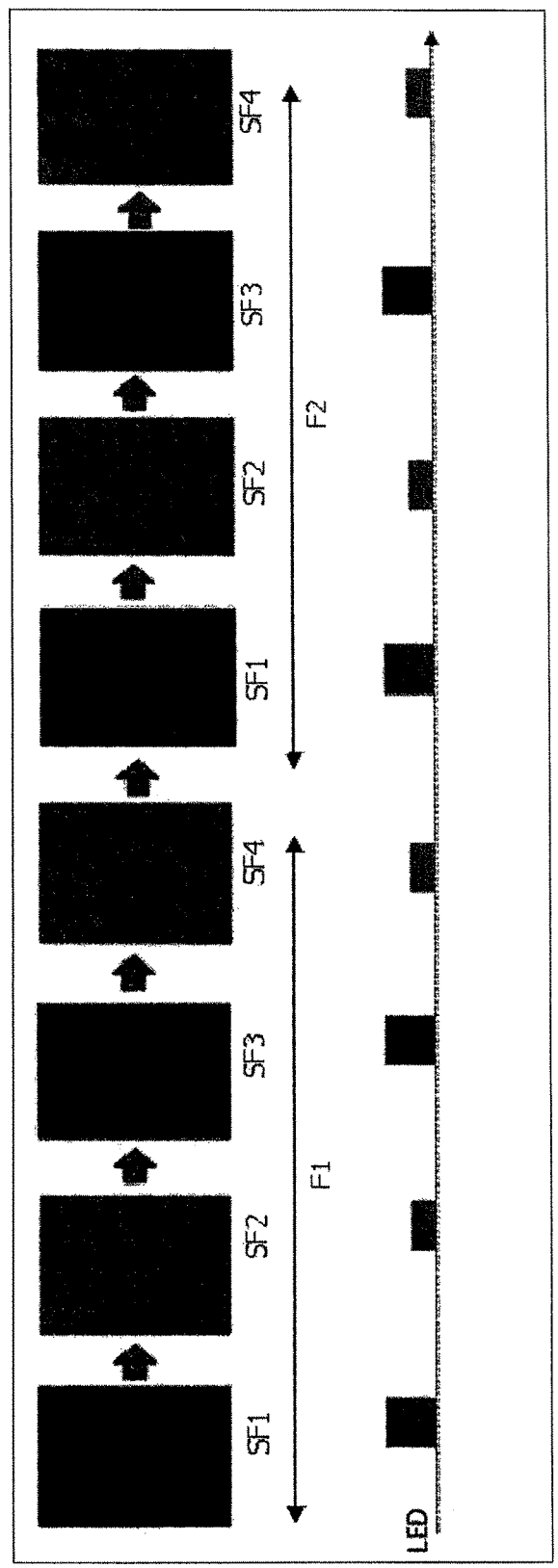
FIG. 3B is a view illustrating brightness of light sources and an image displayed in each of sub-frames of FIG. 3A according to an exemplary embodiment of the present inventive concept.

FIG. 3B is a view illustrating brightness of light sources and an image displayed in each of sub-frames of FIG. 3A according to an exemplary embodiment of the present inventive concept.

Referring to FIGS. 1, 3A and 3B, the light source part 600 turns on the first light source 601 (e.g., the red light source R) and generates a red light in the first sub-frame SF1 of the first frame F1.

The gate driver 300 outputs substantially the same gate signals to the first gate line GL1 and the second gate line GL2 in the first sub-frame SF1 of the first frame F1. The gate driver 300 may output substantially the same gate signals to the (n−1)-th gate line GLn−1 and the n-th gate line GLn in the first sub-frame SF1 of the first frame F1.

The data driver 500 may output the red data signal R1 corresponding to the first gate line GL1 to the data line DL during a logical high period T of the gate signals outputted to the first gate line GL1 and the second gate line GL2 in the first sub-frame SF1 of the first frame F1. The data driver 500 may output a red data signal Rn−1 corresponding to the (n−1)-th gate line GLn−1 to the data line DL during a logical high period T of the gate signals outputted to the (n−1)-th gate line GLn−1 and the n-th gate line GLn in the first sub-frame SF1 of the first frame F1. In an exemplary embodiment of the present inventive concept, the data driver 500 may output the red data signal R2 corresponding to the second gate line GL2 to the data line DL during a logical high period T of the gate signals outputted to the first gate line GL1 and the second gate line GL2 in the first sub-frame SF1 of the first frame F1. The data driver 500 may output a red data signal Rn corresponding to the n-th gate line GLn to the data line DL during a logical high period T of the gate signals outputted to the (n−1)-th gate line GLn−1 and the n-th gate line GLn in the first sub-frame SF1 of the first frame F1.

The light source part 600 turns on the second light source 603 (e.g., the green light source G) and generates a green light in the second sub-frame SF2 of the first frame F1.

The gate driver 300 outputs substantially the same gate signals to the first gate line GL1 and the second gate line GL2 in the second sub-frame SF2 of the first frame F1. The gate driver 300 may output substantially the same gate signals to the (n−1)-th gate line GLn−1 and the n-th gate line GLn in the second sub-frame SF2 of the first frame F1.

The data driver 500 may output the green data signal G1 corresponding to the first gate line GL1 to the data line DL during a logical high period T of the gate signals outputted to the first gate line GL1 and the second gate line GL2 in the second sub-frame SF2 of the first frame F1. The data driver 500 may output a green data signal Gn−1 corresponding to the (n−1)-th gate line GLn−1 to the data line DL during a logical high period T of the gate signals outputted to the (n−1)-th gate line GLn−1 and the n-th gate line GLn in the second sub-frame SF2 of the first frame F1. In an exemplary embodiment of the present inventive concept, the data driver 500 may output the green data signal G2 corresponding to the second gate line GL2 to the data line DL during a logical high period T of the gate signals outputted to the first gate line GL1 and the second gate line GL2 in the second sub-frame SF2 of the first frame F1. The data driver 500 may output a green data signal Gn corresponding to the n-th gate line GLn to the data line DL during a logical high period T of the gate signals outputted to the (n−1)-th gate line GLn−1 and the n-th gate line GLn in the second sub-frame SF2 of the first frame F1.

The light source part 600 turns on the third light source 605 (e.g., the blue light source B) and generates a blue light in the third sub-frame SF3 of the first frame F1.

The gate driver 300 outputs substantially the same gate signals to the first gate line GL1 and the second gate line GL2 in the third sub-frame SF3 of the first frame F1. The gate driver 300 may output substantially the same gate signals to the (n−1)-th gate line GLn−1 and the n-th gate line GLn in the third sub-frame SF3 of the first frame F1.

The data driver 500 may output the blue data signal B2 corresponding to the second gate line GL2 to the data line DL during a logical high period T of the gate signals outputted to the first gate line GL1 and the second gate line GL2 in the third sub-frame SF3 of the first frame F1. The data driver 500 may output a blue data signal Bn corresponding to the n-th gate line GLn to the data line DL during a logical high period T of the gate signals outputted to the (n−1)-th gate line GLn−1 and the n-th gate line GLn in the third sub-frame SF3 of the first frame F1. In an exemplary embodiment of the present inventive concept, the data driver 500 may output the blue data signal B1 corresponding to the first gate line GL1 to the data line DL during a logical high period T of the gate signals outputted to the first gate line GL1 and the second gate line GL2 in the third sub-frame SF3 of the first frame F1. The data driver 500 may output a blue data signal Bn−1 corresponding to the (n−1)-th gate line GLn−1 to the data line DL during a logical high period T of the gate signals outputted to the (n−1)-th gate line GLn−1 and the n-th gate line GLn in the third sub-frame SF3 of the first frame F1.

The light source part 600 turns on the second light source 603 (e.g., the green light source G) and generates a green light in the fourth sub-frame SF4 of the first frame F1.

The gate driver 300 outputs substantially the same gate signals to the first gate line GL1 and the second gate line GL2 in the fourth sub-frame SF4 of the first frame F1. The gate driver 300 may output substantially the same gate signals to the (n−1)-th gate line GLn−1 and the n-th gate line GLn in the fourth sub-frame SF4 of the first frame F1.

The data driver 500 may output the green data signal G2 corresponding to the second gate line GL2 to the data line DL during a logical high period T of the gate signals outputted to the first gate line GL1 and the second gate line GL2 in the fourth sub-frame SF4 of the first frame F1. The data driver 500 may output the green data signal Gn corresponding to the n-th gate line GLn to the data line DL during a logical high period T of the gate signals outputted to the (n−1)-th gate line GLn−1 and the n-th gate line GLn in the fourth sub-frame SF4 of the first frame F1. In an exemplary embodiment of the present inventive concept, the data driver 500 may output the green data signal G1 corresponding to the first gate line GL1 to the data line DL during a logical high period T of the gate signals outputted to the first gate line GL1 and the second gate line GL2 in the fourth sub-frame SF4 of the first frame F1. The data driver 500 may output the green data signal Gn−1 corresponding to the (n−1)-th gate line GLn−1 to the data line DL during a logical high period T of the gate signals outputted to the (n−1)-th gate line GLn−1 and the n-th gate line GLn in the fourth sub-frame SF4 of the first frame F1.

In addition, the light source part 600 turns on the first light source 601 (e.g., the red light source R) and generates a red light in the first sub-frame SF1 of the second frame F2.

The gate driver 300 outputs substantially the same gate signals to the first gate line GL1 and the second gate line GL2 in the first sub-frame SF1 of the second frame F2. The gate driver 300 may output substantially the same gate signals to the (n−1)-th gate line GLn−1 and the n-th gate line GLn in the first sub-frame SF1 of the second frame F2.

The data driver 500 may output the red data signal R2 corresponding to the second gate line GL2 to the data line DL during a logical high period T of the gate signals outputted to the first gate line GL1 and the second gate line GL2 in the first sub-frame SF1 of the second frame F2. The data driver 500 may output the red data signal Rn corresponding to the n-th gate line GLn to the data line DL during a logical high period T of the gate signals outputted to the (n−1)-th gate line GLn−1 and the n-th gate line GLn in the first sub-frame SF1 of the second frame F2. In an exemplary embodiment of the present inventive concept, the data driver 500 may output the red data signal R1 corresponding to the first gate line GL1 to the data line DL during a logical high period T of the gate signals outputted to the first gate line GL1 and the second gate line GL2 in the first sub-frame SF1 of the second frame F2. The data driver 500 may output the red data signal Rn−1 corresponding to the (n−1)-th gate line GLn−1 to the data line DL during a logical high period T of the gate signals outputted to the (n−1)-th gate line GLn−1 and the n-th gate line GLn in the first sub-frame SF1 of the second frame F2.

The light source part 600 turns on the second light source 603 (e.g., the green light source G) and generates a green light in the second sub-frame SF2 of the second frame F2.

The gate driver 300 outputs substantially the same gate signals to the first gate line GL1 and the second gate line GL2 in the second sub-frame SF2 of the second frame F2. The gate driver 300 may output substantially the same gate signals to the (n−1)-th gate line GLn−1 and the n-th gate line GLn in the second sub-frame SF2 of the second frame F2.

The data driver 500 may output the green data signal G2 corresponding to the second gate line GL2 to the data line DL during a logical high period T of the gate signals outputted to the first gate line GL1 and the second gate line GL2 in the second sub-frame SF2 of the second frame F2. The data driver 500 may output the green data signal Gn corresponding to the n-th gate line GLn to the data line DL during a logical high period T of the gate signals outputted to the (n−1)-th gate line GLn−1 and the n-th gate line GLn in the second sub-frame SF2 of the second frame F2. In an exemplary embodiment of the present inventive concept, the data driver 500 may output the green data signal G1 corresponding to the first gate line GL1 to the data line DL during a logical high period T of the gate signals outputted to the first gate line GL1 and the second gate line GL2 in the second sub-frame SF2 of the second frame F2. The data driver 500 may output the green data signal Gn−1 corresponding to the (n−1)-th gate line GLn−1 to the data line DL during a logical high period T of the gate signals outputted to the (n−1)-th gate line GLn−1 and the n-th gate line GLn in the second sub-frame SF2 of the second frame F2.

The light source part 600 turns on the third light source 605 (e.g., the blue light source B) and generates a blue light in the third sub-frame SF3 of the second frame F2.

The gate driver 300 outputs substantially the same gate signals to the first gate line GL1 and the second gate line GL2 in the third sub-frame SF3 of the second frame F2. The gate driver 300 may output substantially the same gate signals to the (n−1)-th gate line GLn−1 and the n-th gate line GLn in the third sub-frame SF3 of the second frame F2.

The data driver 500 may output the blue data signal B1 corresponding to the first gate line GL1 to the data line DL during a logical high period T of the gate signals outputted to the first gate line GL1 and the second gate line GL2 in the third sub-frame SF3 of the second frame F2. The data driver 500 may output the blue data signal Bn−1 corresponding to the (n−1)-th gate line GLn−1 to the data line DL during a logical high period T of the gate signals outputted to the (n−1)-th gate line GLn−1 and the n-th gate line GLn in the third sub-frame SF3 of the second frame F2. In an exemplary embodiment of the present inventive concept, the data driver 500 may output the blue data signal B2 corresponding to the second gate line GL2 to the data line DL during a logical high period T of the gate signals outputted to the first gate line GL1 and the second gate line GL2 in the third sub-frame SF3 of the second frame F2. The data driver 500 may output the blue data signal Bn corresponding to the n-th gate line GLn to the data line DL during a logical high period T of the gate signals outputted to the (n−1)-th gate line GLn−1 and the n-th gate line GLn in the third sub-frame SF3 of the second frame F2.

The light source part 600 turns on the second light source 603 (e.g., the green light source G) and generates a green light in the fourth sub-frame SF4 of the second frame F2.

The gate driver 300 outputs substantially the same gate signals to the first gate line GL1 and the second gate line GL2 in the fourth sub-frame SF4 of the second frame F2. The gate driver 300 may output substantially the same gate signals to the (n−1)-th gate line GLn−1 and the n-th gate line GLn in the fourth sub-frame SF4 of the second frame F2.

The data driver 500 may output the green data signal G1 corresponding to the first gate line GL1 to the data line DL during a logical high period T of the gate signals outputted to the first gate line GL1 and the second gate line GL2 in the fourth sub-frame SF4 of the second frame F2. The data driver 500 may output a green data signal Gn−1 corresponding to the (n−1)-th gate line GLn−1 to the data line DL during a logical high period T of the gate signals outputted to the (n−1)-th gate line GLn−1 and the n-th gate line GLn in the fourth sub-frame SF4 of the second frame F2. In an exemplary embodiment of the present inventive concept, the data driver 500 may output the green data signal G2 corresponding to the second gate line GL2 to the data line DL during a logical high period T of the gate signals outputted to the first gate line GL1 and the second gate line GL2 in the fourth sub-frame SF4 of the second frame F2. The data driver 500 may output a green data signal Gn corresponding to the n-th gate line GLn to the data line DL during a logical high period T of the gate signals outputted to the (n−1)-th gate line GLn−1 and the n-th gate line GLn in the fourth sub-frame SF4 of the second frame F2.

For example, the number of second light sources 603 may be less than the number of first light sources 601 and/or the number of the third light sources 605. For example, the number of the second light sources 603 may be haft of the number of the first light sources 601 or the third light sources 605.

According to an exemplary embodiment of the present inventive concept, when a frame is divided into four sub-frames, substantially the same gate signals are outputted to two gate lines. For example, the two gate lines may be adjacent to each other. Thus, a charging time for a pixel may be doubled. In addition, data signals (e.g., green data signals) corresponding to the two gate lines are alternately outputted in two sub-frames of a certain frame. The same light source (e.g., a green light source) may be turned on in the two sub-frames. Thus, vertical resolution for the light source may be maintained. Furthermore, the number the light sources turned on in the two sub-frames of the frame may be reduced to decrease power consumption. In addition, data signals corresponding to the two gate lines are alternately outputted in the same sub-frames of consecutive frames, and thus, decrease in vertical resolution may be reduced or minimized.

Figure 4:
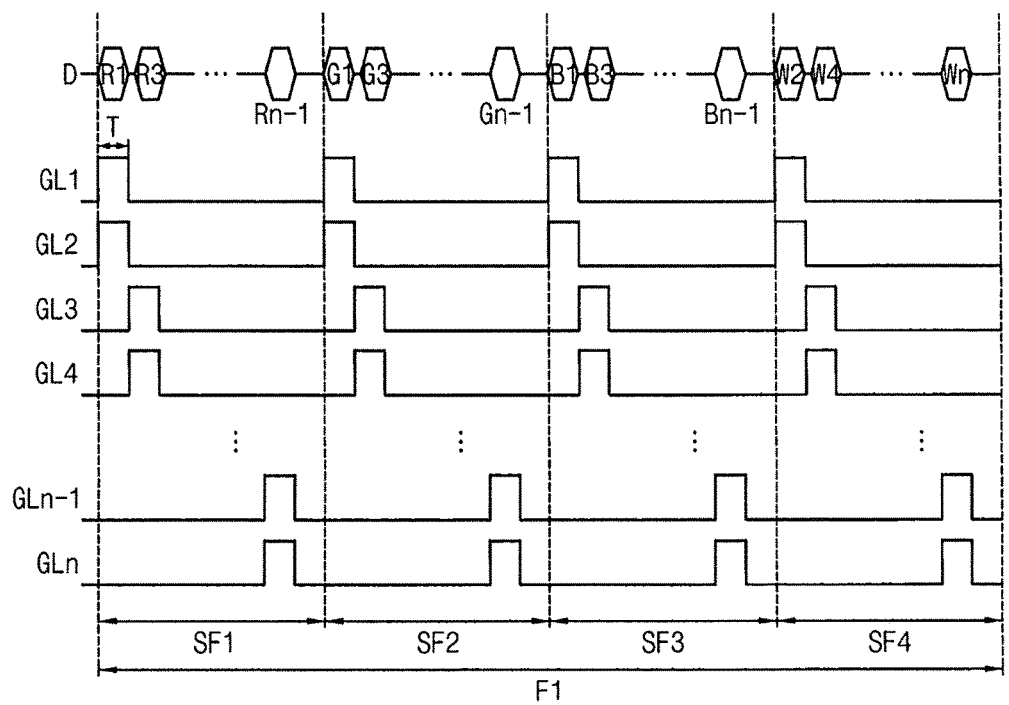
FIG. 4 is a waveform diagram illustrating gate signals and data signals according to an exemplary embodiment of the present inventive concept.
Figure 4:
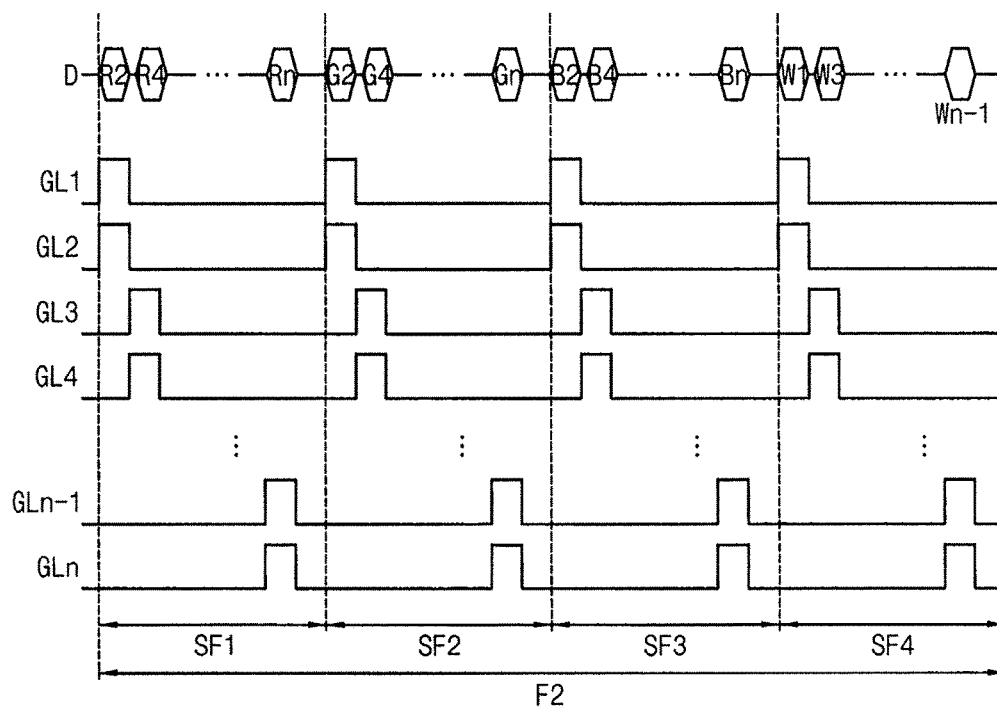

FIG. 4 is a waveform diagram illustrating gate signals and data signals according to an exemplary embodiment of the present inventive concept.

Referring to FIGS. 1 and 4, a light source part 600 sequentially provides lights generated from the first light source 601, a second light source 603, and a third light source 605 to a display panel 100. The light source part 600 may further turn on the first light source 601, the second light source 603, and the third light source 605 at the same time after turning on the third light source 605. For example, the light source part 600 turns on the first light source 601 in a first sub-frame SF1. The light source part 600 turns on the second light source 603 in a second sub-frame SF2. The light source part 600 turns on the third light source 605 in a third sub-frame SF3. The light source part 600 turns on the first light source 601, the second light source 603, and the third light source 605 in a fourth sub-frame SF4.

The first light source 601, the second light source 603, and the third light source 605 may be respectively one of a red light source generating a red light, a green light source generating a green light, and a blue light source generating a blue light. For example, the first light source 601 may be a red light source R, the second light source 603 may be a green light source G, and the third light source 605 may be a blue light source B.

Each of the first light source 601, the second light source 603, and the third light source 605 may include at least one light-emitting diode. The numbers of the first light source 601, the second light source 603, and the third light source 605 may be different from each other.

A gate driver 300 generates gate signals for driving gate lines GL in response to a first control signal CONT1 received from a timing controller 200. The gate driver 300 sequentially outputs the gate signals to the gate lines GL.

The gate driver 300 outputs substantially the same gate signals to a first gate line GL1 and a second gate line GL2 adjacent to the first gate line GL1. The gate driver 300 may output substantially the same gate signals to an (n−1)-th gate line GLn−1 and an n-th gate line GLn adjacent to the (n−1)-th gate line GLn−1. Here, n may be an even integer number.

The first gate line GL1 to the n-th gate line GLn are scanned in the first sub-frame SF1. The first gate line GL1 to the n-th gate line GLn are scanned in the second sub-frame SF2. The first gate line GL1 to the n-th gate line GLn are scanned in the third sub-frame SF3. The first gate line GL1 to the n-th gate line GLn are scanned in the fourth sub-frame SF4.

A data driver 500 receives a second control signal CONT2 and a data signal DATA from the timing controller 200, and receives a gamma reference voltage VGREF from a gamma reference voltage generator 400. The data driver 500 changes the data signal DATA to an analog data signal by using the gamma reference voltage VGREF. The data driver 500 outputs the analog data signal to the data line DL.

The data driver 500 may output a data signal (e.g., the analog data signal), which corresponds to the first gate line GL1, to the data line DL during a logical high period T of the gate signals outputted to the first gate line GL1 and the second gate line GL2. In an exemplary embodiment of the present inventive concept, the data driver 500 may output a data signal, which corresponds to the second gate line GL2, to the data line DL during a logical high period T of the gate signals outputted to the first gate line GL1 and the second gate line GL2.

For example, the data driver 500 may output a red data signal R1 corresponding to the first gate line GL1 to the data line DL during a logical high period T of the gate signals outputted to the first gate line GL1 and the second gate line GL2 in the first sub-frame SF1. The data driver 500 may output a green data signal G1 corresponding to the first gate line GL1 to the data line DL during a logical high period T of the gate signals outputted to the first gate line GL1 and the second gate line GL2 in the second sub-frame SF2. The data driver 500 may output a blue data signal B1 corresponding to the first gate line GL1 to the data line DL during a logical high period T of the gate signals outputted to the first gate line GL1 and the second gate line GL2 in the third sub-frame SF3. The data driver 500 may output a white data signal W2 corresponding to the second gate line GL2 to the data line DL during a logical high period T of the gate signals outputted to the first gate line GL1 and the second gate line GL2 in the fourth sub-frame SF4.

In an exemplary embodiment of the present inventive concept, the data driver 500 may output a red data signal R2 corresponding to the second gate line GL2 to the data line DL during a logical high period T of the gate signals outputted to the first gate line GL1 and the second gate line GL2 in the first sub-frame SF1. The data driver 500 may output a green data signal G2 corresponding to the second gate line GL2 to the data line DL during a logical high period T of the gate signal in the second sub-frame SF2. The data driver 500 may output a blue data signal B2 corresponding to the second gate line GL2 to the data line DL during a logical high period T of the gate signal in the third sub-frame SF3. The data driver 500 may output a white data signal W1 corresponding to the first gate line GL1 to the data line DL during a logical high period T of the gate signal in the fourth sub-frame SF4.

For example, referring to FIG. 4, the data driver 500 may output the red data signal R1 corresponding to the first gate line GL1 to the data line DL during a logical high period T of the gate signals outputted to the first gate line GL1 and the second gate line GL2 in the first sub-frame SF1 of the first frame F1. In addition, the data driver 500 may output the red data signal R2 corresponding to the second gate line GL2 to the data line DL during a logical high period T of the gate signals outputted to the first gate line GL1 and the second gate line GL2 in the first sub-frame SF1 of the second frame F2.

The data driver 500 may output the green data signal G1 corresponding to the first gate line GL1 to the data line DL during a logical high period T of the gate signals outputted to the first gate line GL1 and the second gate line GL2 in the second sub-frame SF2 of the first frame F1. In addition, the data driver 500 may output the green data signal G2 corresponding to the second gate line GL2 to the data line DL during a logical high period T of the gate signals outputted to the first gate line GL1 and the second gate line GL2 in the second sub-frame SF2 of the second frame F2.

The data driver 500 may output the blue data signal B1 corresponding to the first gate line GL1 to the data line DL during a logical high period T of the gate signals outputted to the first gate line GL1 and the second gate line GL2 in the third sub-frame SF3 of the first frame F1. In addition, the data driver 500 may output the blue data signal B2 corresponding to the second gate line GL2 to the data line DL during a logical high period T of the gate signals outputted to the first gate line GL1 and the second gate line GL2 in the third sub-frame SF3 of the second frame F2.

The data driver 500 may output the white data signal W2 corresponding to the second gate line GL2 to the data line DL during a logical high period T of the gate signals outputted to the first gate line GL1 and the second gate line GL2 in the fourth sub-frame SF4 of the first frame F1. In addition, the data driver 500 may output the white data signal W1 corresponding to the first gate line GL1 to the data line DL during a logical high period T of the gate signals outputted to the first gate line GL1 and the second gate line GL2 in the fourth sub-frame SF4 of the second frame F2.

According to an exemplary embodiment of the present inventive concept, when a frame is divided into four sub-frames, substantially the same gate signals are outputted to two gate lines. For example, the two gate lines may be adjacent to each other. Thus, a charging time for a pixel may be doubled. Since the frame includes a sub-frame in which a white light is generated, power consumption may be reduced. In addition, data signals corresponding to the two gate lines are alternately outputted in the same sub-frames of consecutive frames, and thus, decrease in vertical resolution may be reduced or minimized.

According to an exemplary embodiment of the present inventive concept, a double-gate driving scheme is applied to increase a charging time for a pixel of a display panel. The present inventive concept may be embodied by combining various display methods such as an RGBG (e.g., Red, Green, Blue, Green) configuration, an RGBW (e.g., Red, Green, Blue, White), an interlace configuration, or the like. Thus, power consumption may be reduced and a display quality may be increased.

The foregoing is illustrative of exemplary embodiments of the present inventive concept and the present inventive concept should not to be construed as being limited to the exemplary embodiments disclosed herein. Although a few exemplary embodiments have been described, it will be understood that various modifications in forms and detail may be possible without departing from the spirit and scope of the present inventive concept.

What is claimed is:

1. A method for driving a display panel, the method comprising:
    dividing a frame into at least three sub-frames:
    turning on a first light source configured to generate a first light in a first sub-frame of each of first and second frames, the second frame being consecutive to the first frame;
    turning on a second light source configured to generate a second light in a second sub-frame of each of the first and second frames, the second light having a color different from a color of the first light;
    turning on a third light source configured to generate a third light in a third sub-frame of each of the first and second frames, the third light having a color different from the colors of the first and second lights;
    applying double gating by outputting the same first gate signals to a first gate line and a second gate line adjacent to the first gate line; and
    alternately outputting one of a first data signal corresponding to the first gate line or a second data signal corresponding to the second gate line to a data line during an active period of the first gate signals in each of the first sub-frame, second sub-frame and third sub-frames.

2. The method of claim 1, wherein the first data signal corresponding to the first gate line is outputted to the data line during an active period of the first gate signals in the first sub-frame of the first frame, and the second data signal corresponding to the second gate line is outputted to the data line during an active period of the first gate signals in the first sub-frame of the second frame.

3. The method of claim 1, further comprising:
    turning on the second light source in a fourth sub-frame of each of the first and second frames.

4. The method of claim 3, wherein a number of the second light sources is less than a number of the first light sources or a number of the third light sources.

5. The method of claim 1, wherein the second light source is configured to generate a green light.

6. The method of claim 1, further comprising:
    turning on the first light source, the second light source, and the third light source in a fourth sub-frame of each of the first and second frames.

7. The method of claim 6, wherein the first data signal corresponding to the first gate line is outputted to the data line during an active period of the first gate signals in the first sub-frame of the first frame, and
    the second data signal corresponding to the second gate line is outputted to the data line during an active period of the first gate signals in the first sub-frame of the second frame.

8. A method for driving a display panel, the method comprising:
    turning on a first light source configured to generate a first light in a first sub-frame of each of first and second frames, the second frame being consecutive to the first frame;
    turning on a second light source configured to generate a second light in a second sub-frame of each of the first and second frames, the second light having a color different from a color of the first light;
    turning on a third light source configured to generate a third light in a third sub-frame of each of the first and second frames, the third light having a color different from the colors of the first and second lights;
    outputting the same first gate signals to a first gate line and a second gate line adjacent to the first gate line;
    outputting one of a first data signal corresponding to the first gate line or a second data signal corresponding to the second gate line to a data line during an active period of the first gate signals in each of the first through third sub-frames; and
    turning on the second light source in a fourth sub-frame of each of the first and second frames,
    wherein the first data signal corresponding to the first gate line is outputted to the data line during an active period of the first gate signals in the second sub-frame of the first frame, and
    the second data signal corresponding to the second gate line is outputted to the data line during an active period of the first gate signals in the fourth sub-frame of the first frame.

9. The method of claim 8, wherein the first data signal corresponding to the first gate line is outputted to the data line during an active period of the first gate signals in the second sub-frame of the second frame, and
    the second data signal corresponding to the second gate line is outputted to the data line during an active period of the first gate signals in the fourth sub-frame of the second frame.

10. A method for driving a display panel, the method comprising:
    turning on a first light source configured to generate a first light in a first sub-frame of each of first and second frames, the second frame being consecutive to the first frame;
    turning on a second light source configured to generate a second light in a second sub-frame of each of the first and second frames, the second light having a color different from a color of the first light;

turning on a third light source configured to generate a third light in a third sub-frame of each of the first and second frames, the third light having a color different from the color of the first and second lights;

outputting the same first gate signals to a first gate line and a second gate line adjacent to the first gate line; and outputting one of a first data signal corresponding to the first gate line or a second data signal corresponding to the second gate line to a data line during an active period of the first gate signals in each of the first through third sub-frames turning on the second light source in a fourth sub-frame of each of the first and second frames, wherein the first data signal corresponding to the first gate line is outputted to the data line during an active period of the first gate signals in the first sub-frame of the first frame, and the second data signal corresponding to the second gate line is outputted to the data line during an active period of the first gate signals in the first sub-frame of the second frame.

11. A method for driving a display panel, the method comprising:

turning on a first light source configured to generate a first light in a first sub-frame of each of the first and second frames, the second frame being consecutive to the first frame;

turning on a second light source configured to generate a second light in a second sub-frame of each of the first and second frames, the second light having a color different from a color of the first light;

turning on a third light source configured to generate a third light in a third sub-frame of each of the first and second frames, the third light having a color different from the colors of the first and second lights;

outputting the same first gate signals to a first gate line and a second gate line adjacent to the first gate line;

outputting one of a first data signal corresponding to the first gate line or a second data signal corresponding to the second gate line to a data line during an active period of the first gate signals in each of the first through third sub-frames turning on the second light source in a fourth sub-frame of each of the first and second frames; and turning on the first light source, the second light source, and the third light source in a fourth sub-frame of each of the first and second frames, wherein the first data signal corresponding to the first gate line is outputted to the data line during an active period of the first gate signals in the first sub-frame of the first frame, the second sub-frame of the first frame, or the third sub-frame of the first frame, and the second data signal corresponding to the second gate line is outputted to the data line during an active period of the first gate signals in the fourth sub-frame of the first frame.

12. A display apparatus comprising:

a display panel configured to display an image;

a light source part configured to provide light to the display panel, and the light source part being configured to turn on a first light source for generating a first light in a first sub-frame of each of first and second frames, to turn on a second light source for generating a second light in a second sub-frame of each of the first and second frames, and to turn on a third light source for generating a third light in a third sub-frame of each of the first and second frames, wherein the second frame is consecutive to the first frame, and the first light, the second light, and the third lights have different colors from each other;

a gate driver configured to output the same first gate signals to a first gate line and a second gate line of the display panel, the second gate line being adjacent to the first gate line; and a data driver configured to output one of a first data signal corresponding to the first gate line or a second data signal corresponding to the second gate line to a data line of the display panel during an active period of the first gate signal in each of the first sub-frame, second sub-frame, and third sub-frames, and to output a white data signal corresponding to the second gate line to the data line during an active period in a fourth sub-frame.

13. The display apparatus of claim 12, wherein the data driver is configured to output the first data signal corresponding to the first gate line to the data line during an active period of the first gate signals in the first sub-frame of the first frame, and to output the second data signal corresponding to the second gate line to the data line during an active period of the first gate signals in the first sub-frame of the second frame.

14. The display apparatus of claim 12, wherein the light source part is configured to turn on the second light source in the fourth sub-frame of each of the first and second frames.

15. The display apparatus of claim 14, wherein the second light source is configured to generate a green light.

16. The display apparatus of claim 14, wherein a number of the second light sources is less than a number of the first light sources or a number of the third light sources.

17. The display apparatus of claim 12, wherein the light source part is configured to turn on the first light source, the second light source, and the third light source in a fourth sub-frame of each of the first and second frames.

18. The display apparatus of claim 17, wherein the data driver is configured to output the first data signal corresponding to the first gate line to the data line during an active period of the first gate signals in the first sub-frame of the first frame, the second sub-frame of the first frame, or the third sub-frame of the first frame, and to output the second data signal corresponding to the second gate line to the data line during an active period of the first gate signals in the fourth sub-frame of the first frame.

19. A display apparatus comprising:

a display panel configured to display an image;

a light source part configured to provide light to the display panel, and the light source part being configured to turn on a first light source for generating a first light in a first sub-frame of each of first and second frames, to turn on a second light source for generating a second light in a second sub-frame of each of the first and second frames, and to turn on a third light source for generating a third light in a third sub-frame of each of the first and second frames, wherein the second frame is consecutive to the first frame, and the first through third lights have different colors from each other;

a gate driver configured to output the same first gate signal to a first gate line and a second gate line of the display panel, the second gate line being adjacent to the first gate line; and a data driver configured to output one of a first data signal corresponding to the first gate line or a second data signal corresponding to the second gate line to a data line of the display panel during an active period of the first gate signal in each of the first through third sub-frames, wherein the light source part is configured to turn on the second light source in a fourth sub-frame of each of the first and second frames, and wherein the data driver is configured to output the first data signal corresponding to the first gate line to the data line during an active period of the first gate signals in the second sub-frame of the first frame, and to output the second data signal corresponding to the second gate line to the data line during an active period of the first gate signals in the fourth sub-frame of the first frame.

20. A method for driving a display panel, the method comprising:

turning on a first light source having a first color configured to generate a first light in a first sub-frame in a frame, wherein the frame includes the first sub-frame, a second sub-frame, a third sub-frame, and a fourth sub-frame;

turning on the first light source having the first color in the third sub-frame in the frame;

applying double gating by outputting the same first gate signals to a first gate line and a second gate line adjacent to the first gate line; and outputting a first data signal corresponding to the first gate line to a data line during an active period of the first gate signals in the first sub-frame of the frame; and outputting a second data signal corresponding to the second gate line to the data line during an active period of the first gate signals in the third sub-frame of the frame, and outputting a white data signal corresponding to the second gate line to the data line during an active period in the fourth sub-frame.

* * * * *